US010873570B2

(12) United States Patent
Chaudhri

(10) Patent No.: US 10,873,570 B2
(45) Date of Patent: *Dec. 22, 2020

(54) SYSTEM AND METHOD FOR EFFICIENT REPLICATION OF AND ACCESS TO APPLICATION SPECIFIC ENVIRONMENTS AND DATA

(71) Applicant: Imran Chaudhri, Potomac, MD (US)

(72) Inventor: Imran Chaudhri, Potomac, MD (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/628,065

(22) Filed: Jun. 20, 2017

(65) Prior Publication Data

US 2017/0289124 A1 Oct. 5, 2017

Related U.S. Application Data

(63) Continuation of application No. 14/253,163, filed on Apr. 15, 2014, now Pat. No. 9,686,259, which is a continuation of application No. 11/614,226, filed on Dec. 21, 2006, now Pat. No. 8,738,750.

(60) Provisional application No. 60/751,983, filed on Dec. 21, 2005.

(51) Int. Cl.
| | |
|---|---|
| *G06F 15/173* | (2006.01) |
| *H04L 29/06* | (2006.01) |
| *G06F 16/21* | (2019.01) |
| *G06F 16/40* | (2019.01) |
| *H04L 29/08* | (2006.01) |

(52) U.S. Cl.
CPC .............. *H04L 63/08* (2013.01); *G06F 16/21* (2019.01); *G06F 16/40* (2019.01); *H04L 63/20* (2013.01); *H04L 67/104* (2013.01); *H04L 67/1068* (2013.01); *H04L 67/1095* (2013.01)

(58) Field of Classification Search
USPC ................................ 709/205, 223, 226, 248
See application file for complete search history.

(56) References Cited

U.S. PATENT DOCUMENTS

| | | | | |
|---|---|---|---|---|
| 7,207,057 | B1 * | 4/2007 | Rowe ................ | H04L 29/06027 725/144 |
| 7,392,533 | B2 * | 6/2008 | Ternasky ................ | G06F 21/10 713/170 |
| 7,711,835 | B2 * | 5/2010 | Braddy .................... | G06F 21/10 709/229 |
| 2002/0083183 | A1 | 6/2002 | Pujare et al. | |
| 2003/0055983 | A1 * | 3/2003 | Callegari ................ | G06F 16/29 709/227 |
| 2003/0063770 | A1 | 4/2003 | Svendsen et al. | |

(Continued)

*Primary Examiner* — Liang Che A Wang
(74) *Attorney, Agent, or Firm* — Capitol Patent & Trademark Law Firm, PLLC

(57) ABSTRACT

A peer-to-peer system and method for efficient replication of and access to application specific environments and their data that includes automatically accessing application specific metadata to determine the location of application specific data and then replicating or providing access to the application metadata and data to a set of peers. A system and method for efficient replication of and access to application specific environments and data that includes automatically accessing a source application's metadata to determine the location of the source application's data and then automatically transferring and transferring the application metadata and data to a target application's metadata and data.

22 Claims, 12 Drawing Sheets

Component and Module view of Inter-application synchronization system.

(56) References Cited

U.S. PATENT DOCUMENTS

| | | | |
|---|---|---|---|
| 2003/0135629 A1* | 7/2003 | Sasaki | G06Q 30/02 |
| | | | 709/229 |
| 2004/0044738 A1* | 3/2004 | Ohno | H04L 29/06 |
| | | | 709/206 |
| 2004/0068524 A1 | 4/2004 | Aboulhosn et al. | |
| 2004/0148434 A1 | 7/2004 | Matsubara et al. | |
| 2005/0131871 A1 | 6/2005 | Howard et al. | |
| 2005/0246389 A1* | 11/2005 | Shah | G06F 9/52 |
| 2006/0041871 A1 | 2/2006 | Friedman et al. | |
| 2006/0101064 A1 | 5/2006 | Strong et al. | |
| 2006/0136502 A1 | 6/2006 | Williams et al. | |
| 2006/0173864 A1 | 8/2006 | Dart et al. | |
| 2007/0067349 A1 | 3/2007 | Jhaveri et al. | |
| 2007/0271317 A1 | 11/2007 | Carmel | |

\* cited by examiner

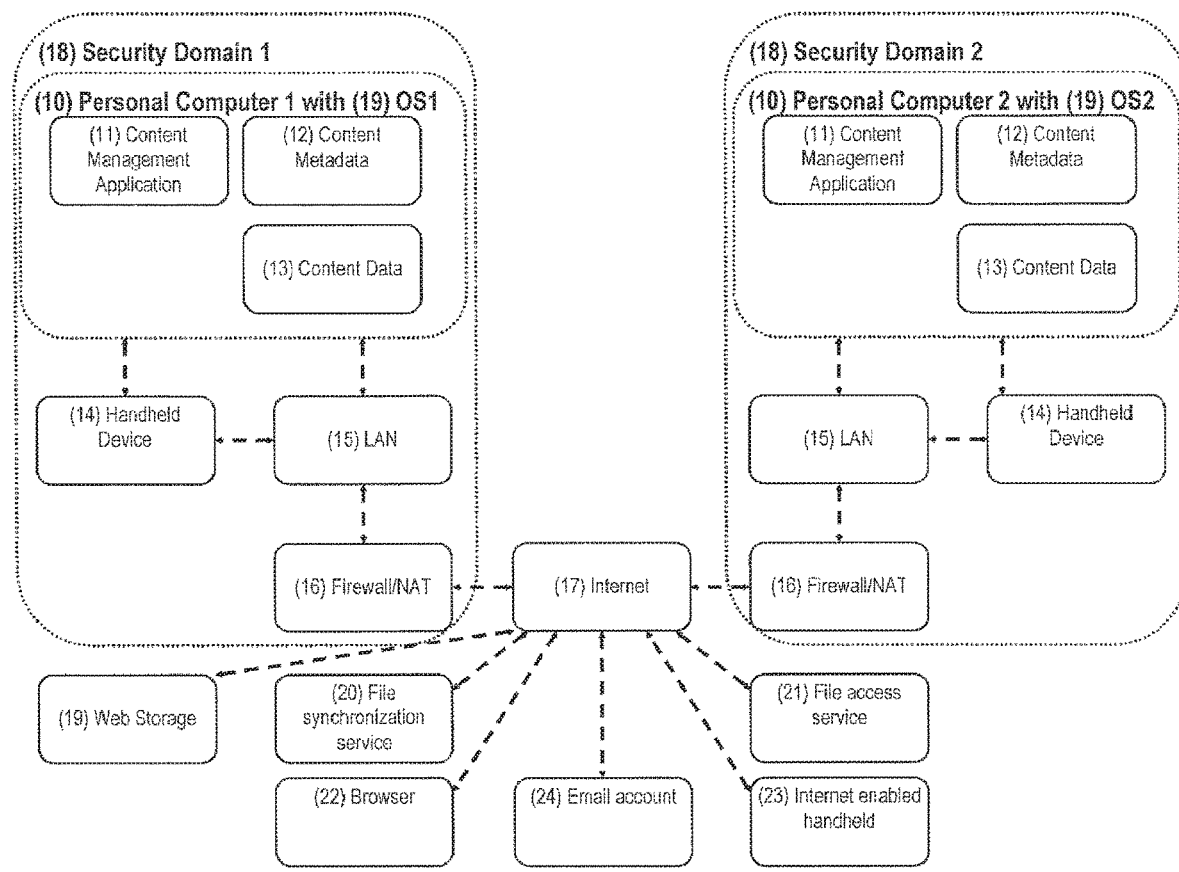
Figure 1. Conventional networking environment with content management applications and PRIOR ART synchronization techniques.

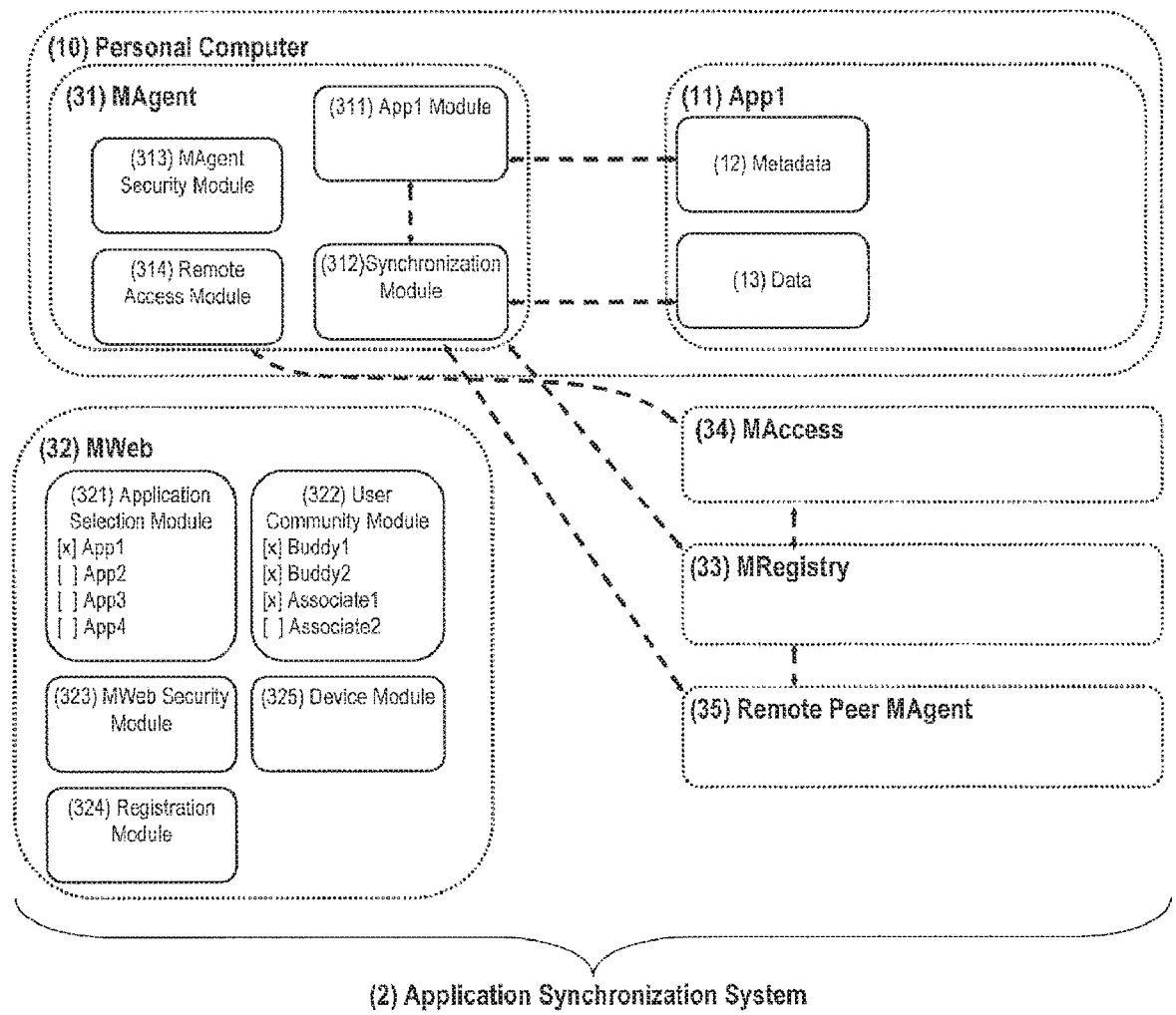
Figure 2. Component and Module view of application level synchronization system.

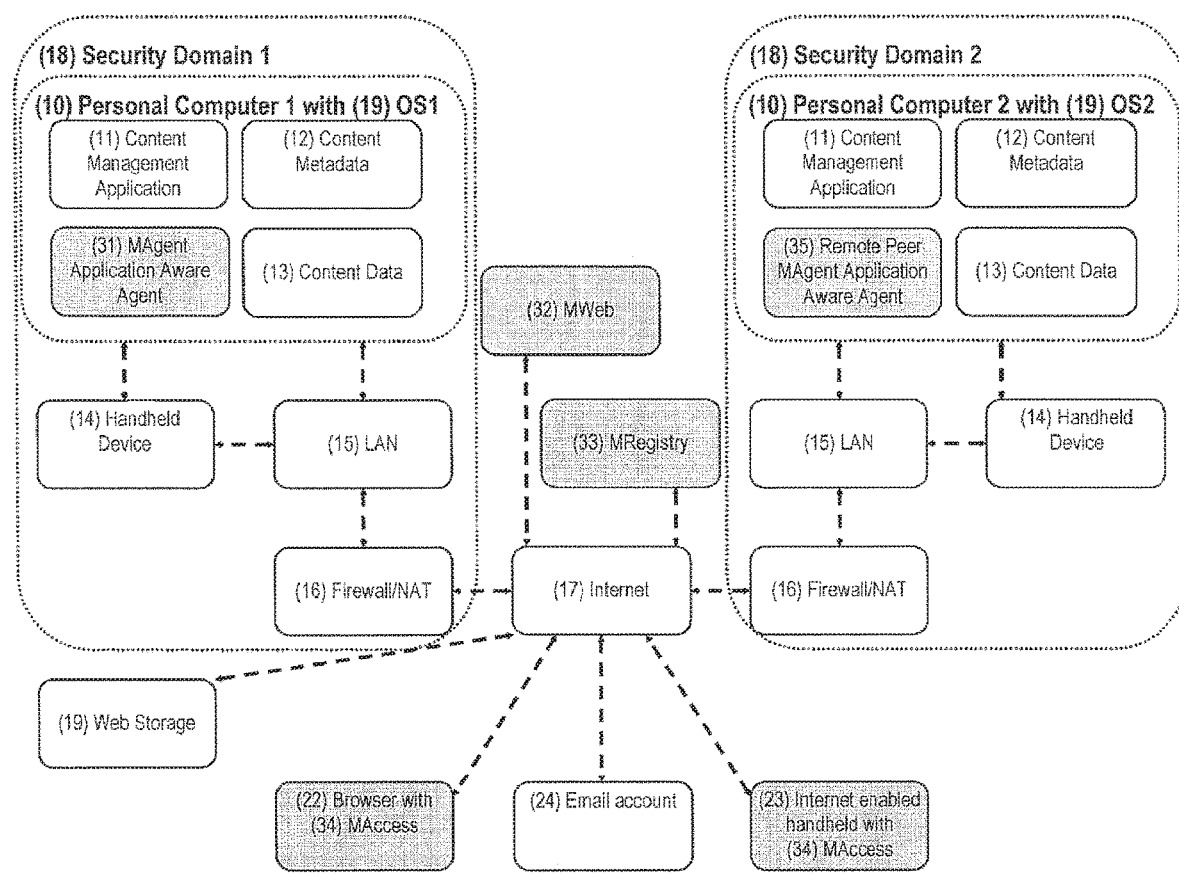
Figure 3. Component view of application level synchronization system in a conventional networking environment.

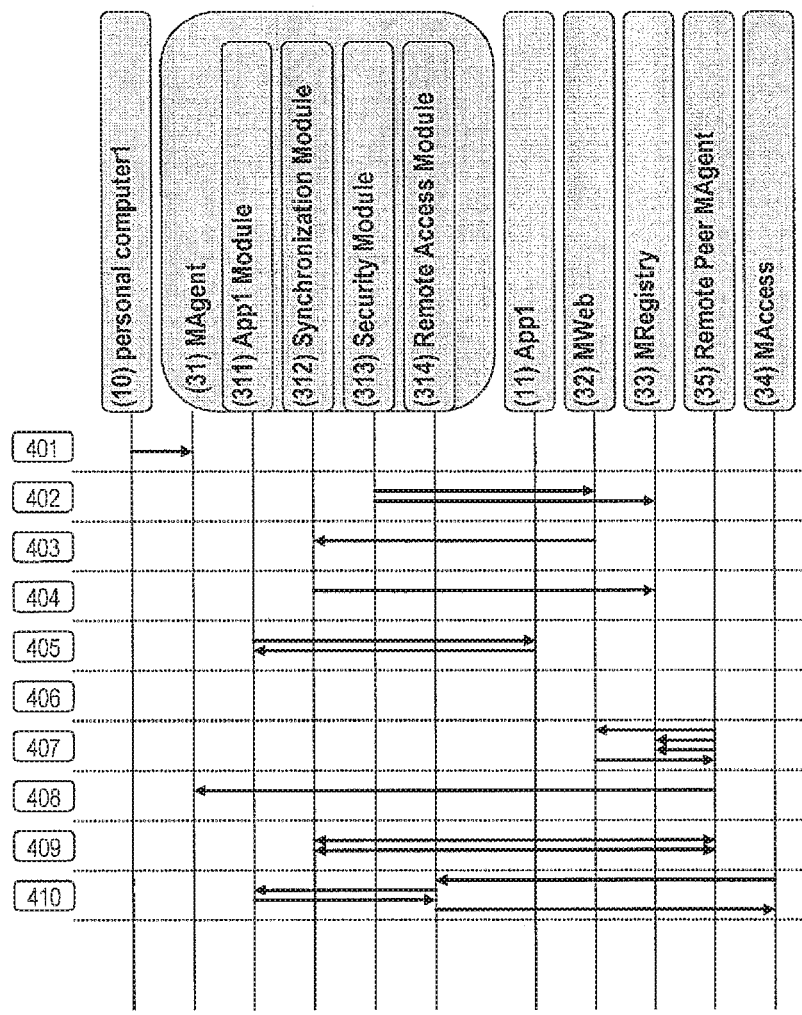
Figure 4. Example flow diagram for an application level synchronization system

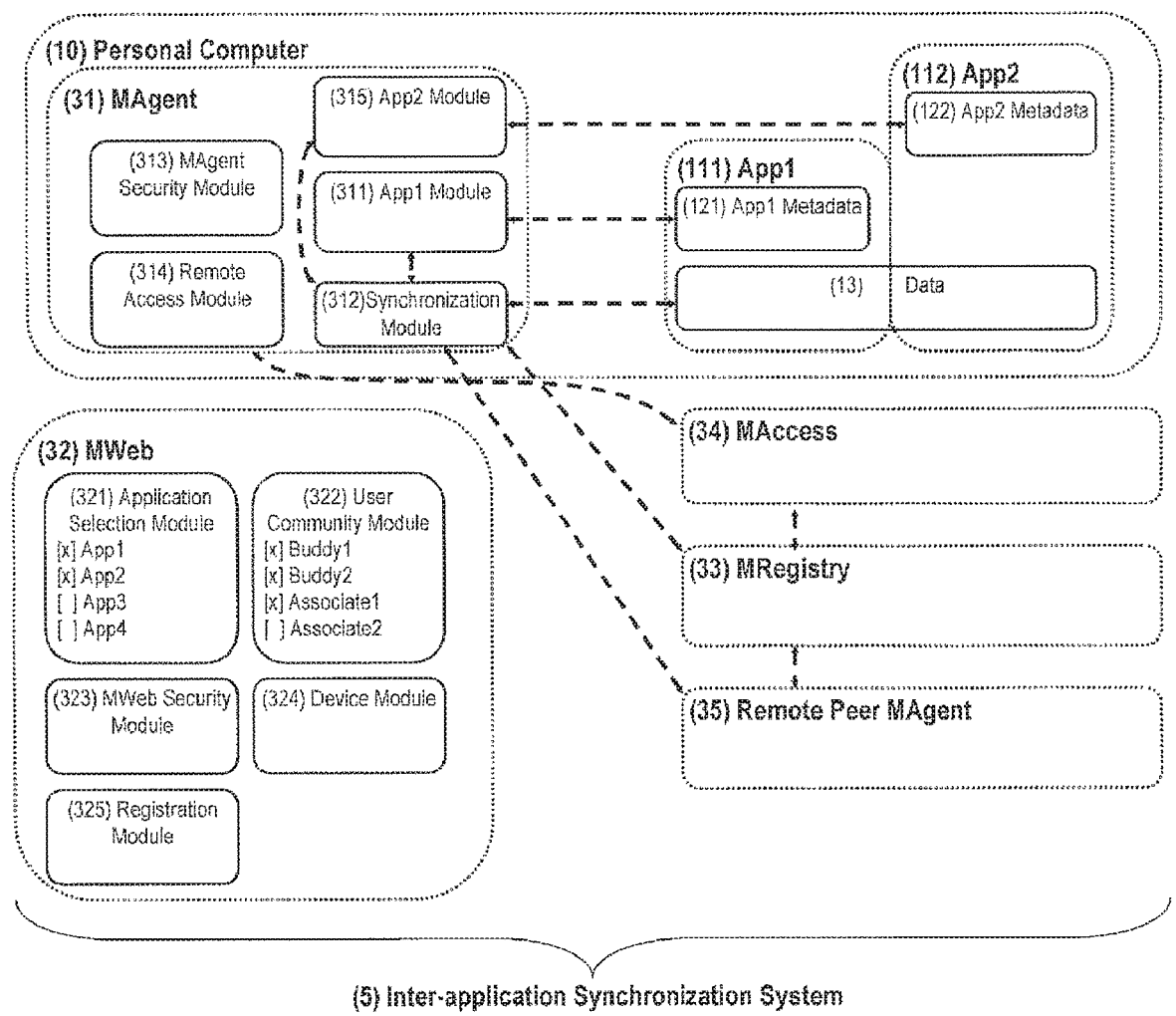
Figure 5. Component and Module view of Inter-application synchronization system.

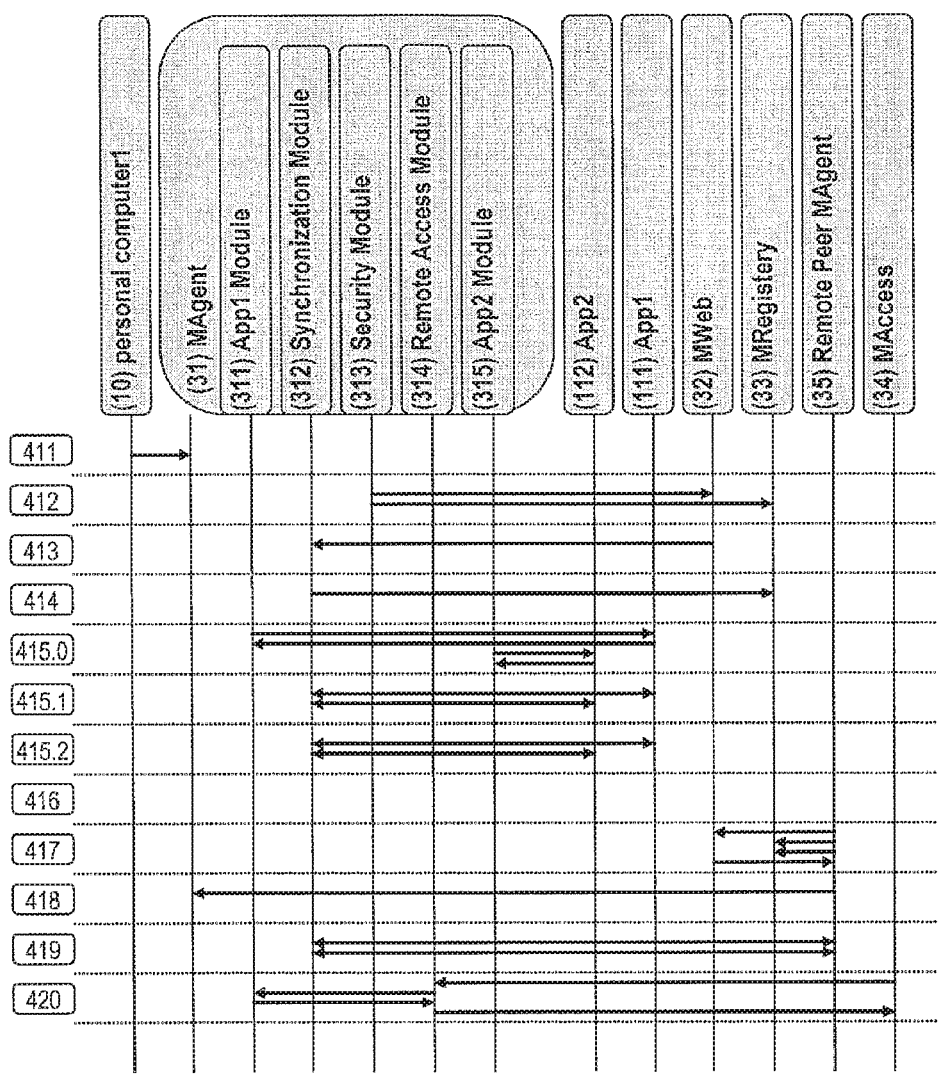
Figure 6. Example flow diagram for an inter-application level synchronization system

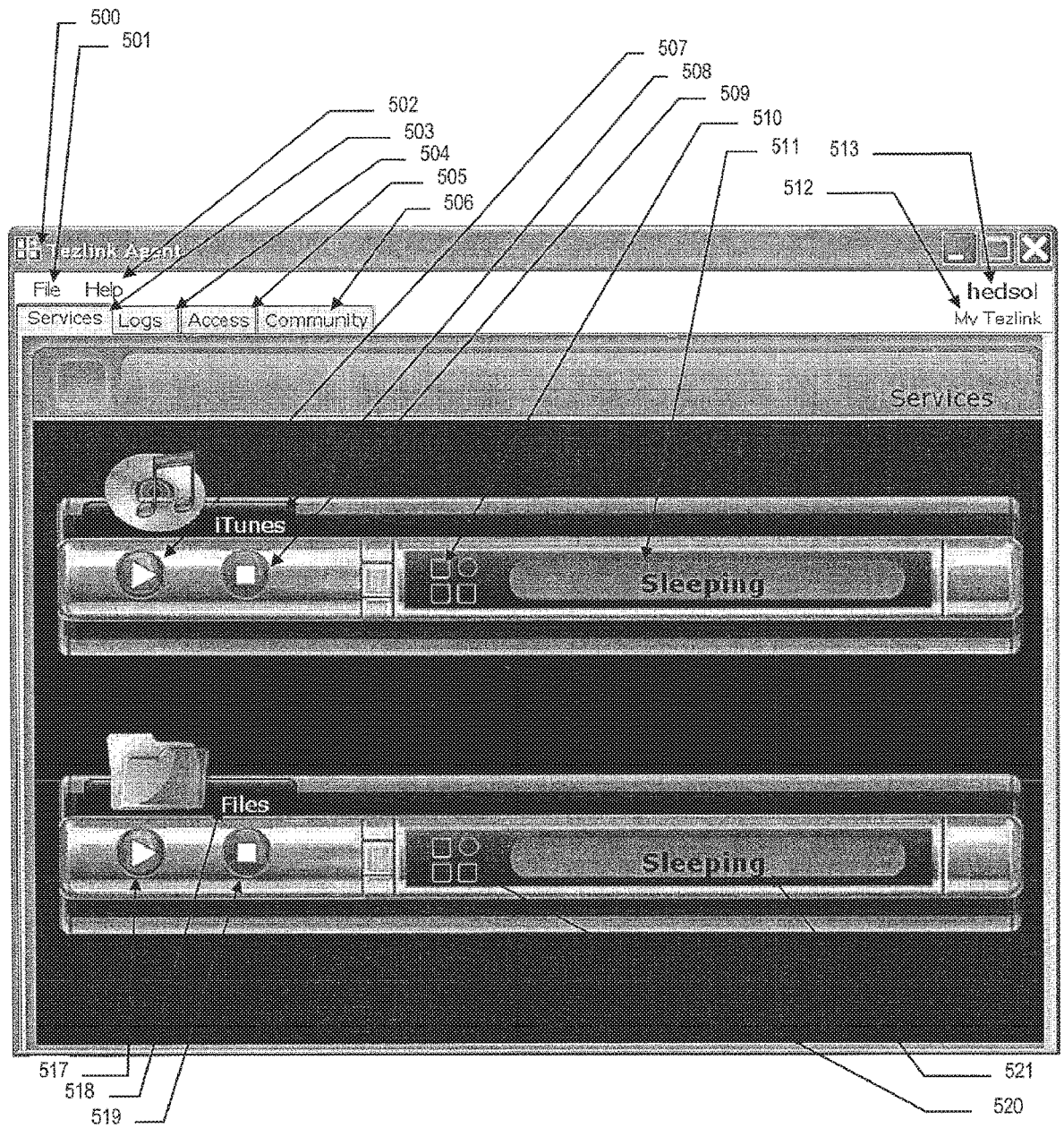
Figure 7. MAgent GUI – Default Status

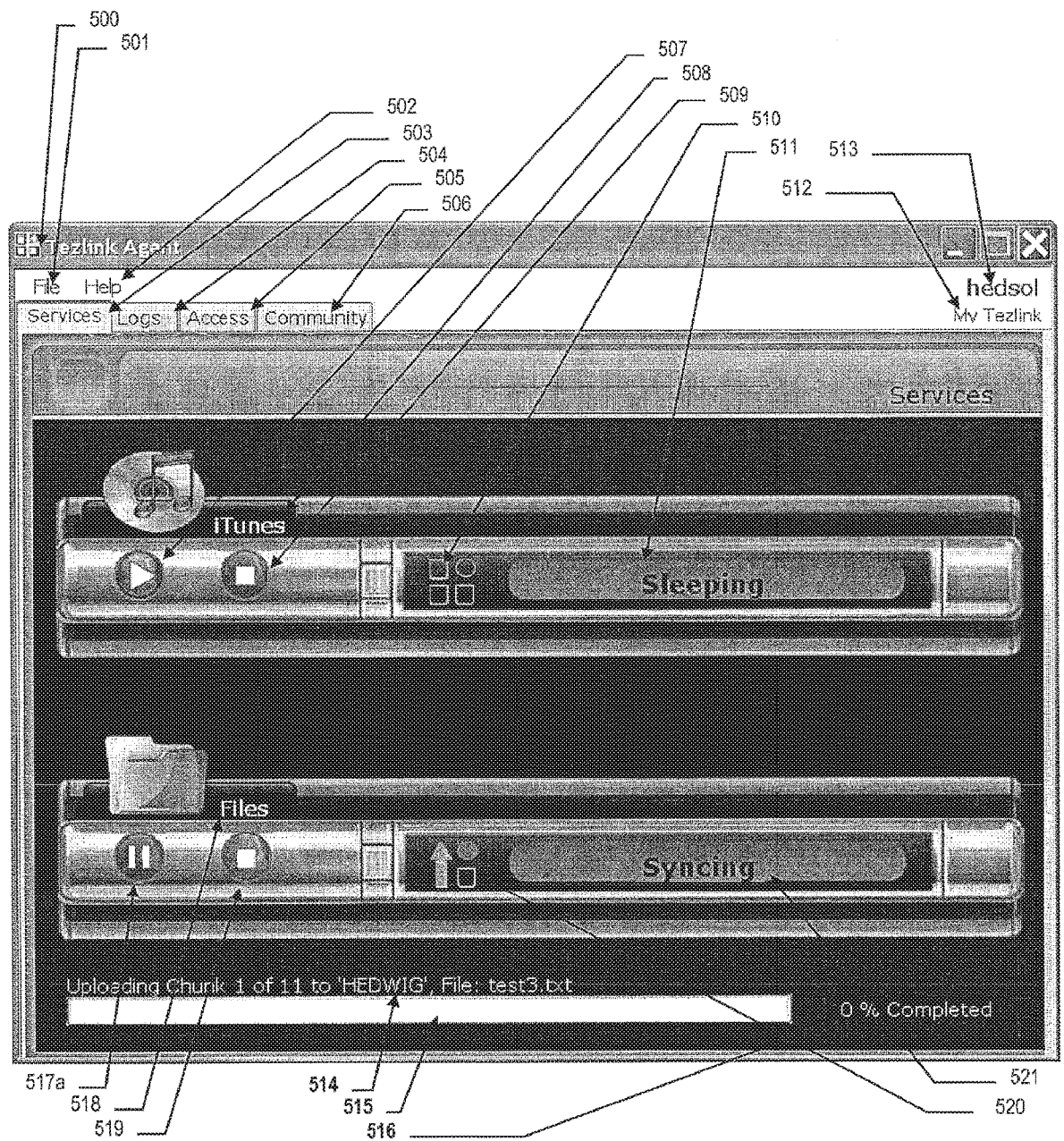
Figure 8. MAgent GUI – File service syncing state with file transfer

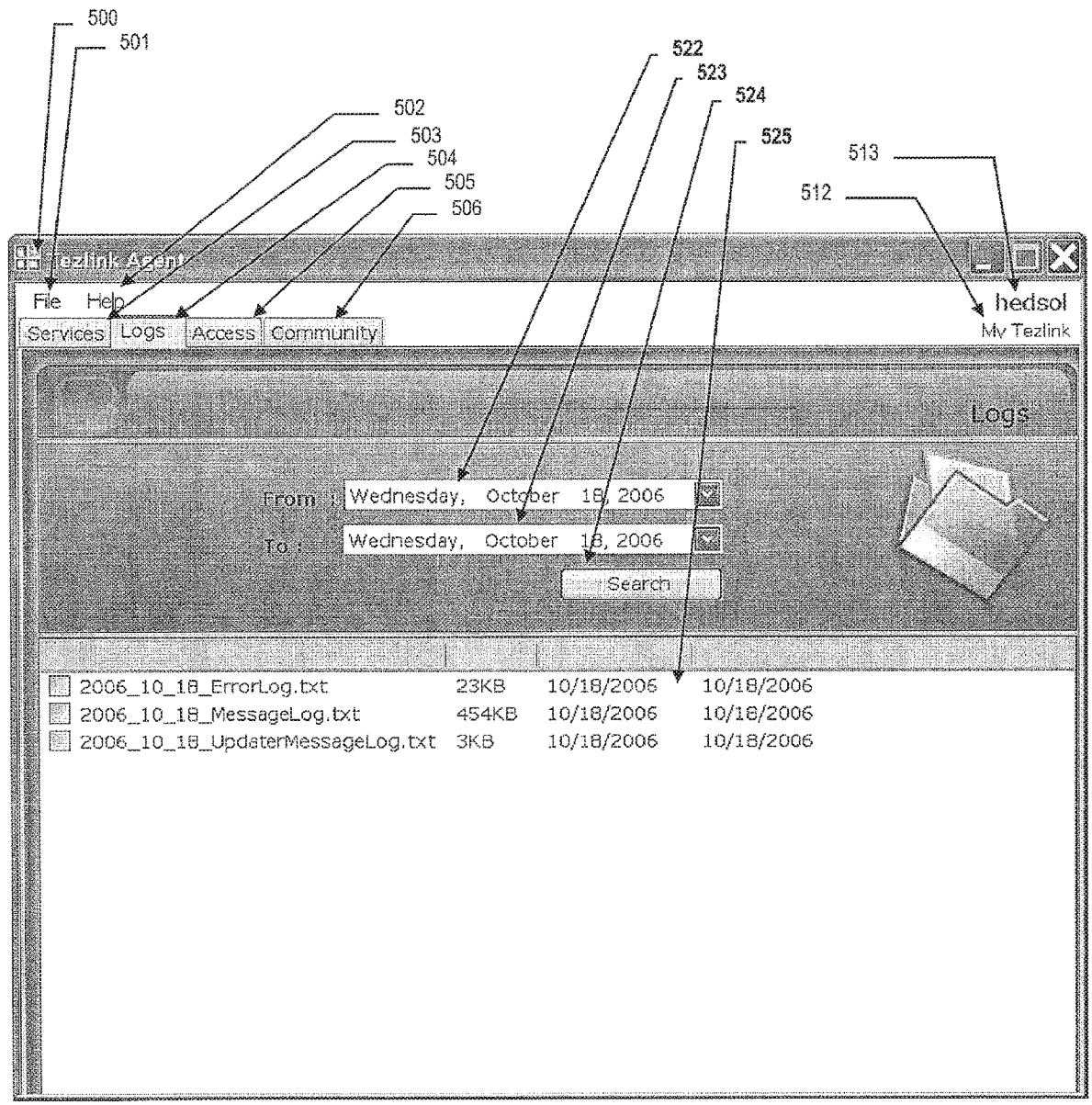
Figure 9. MAgent GUI – Logs page

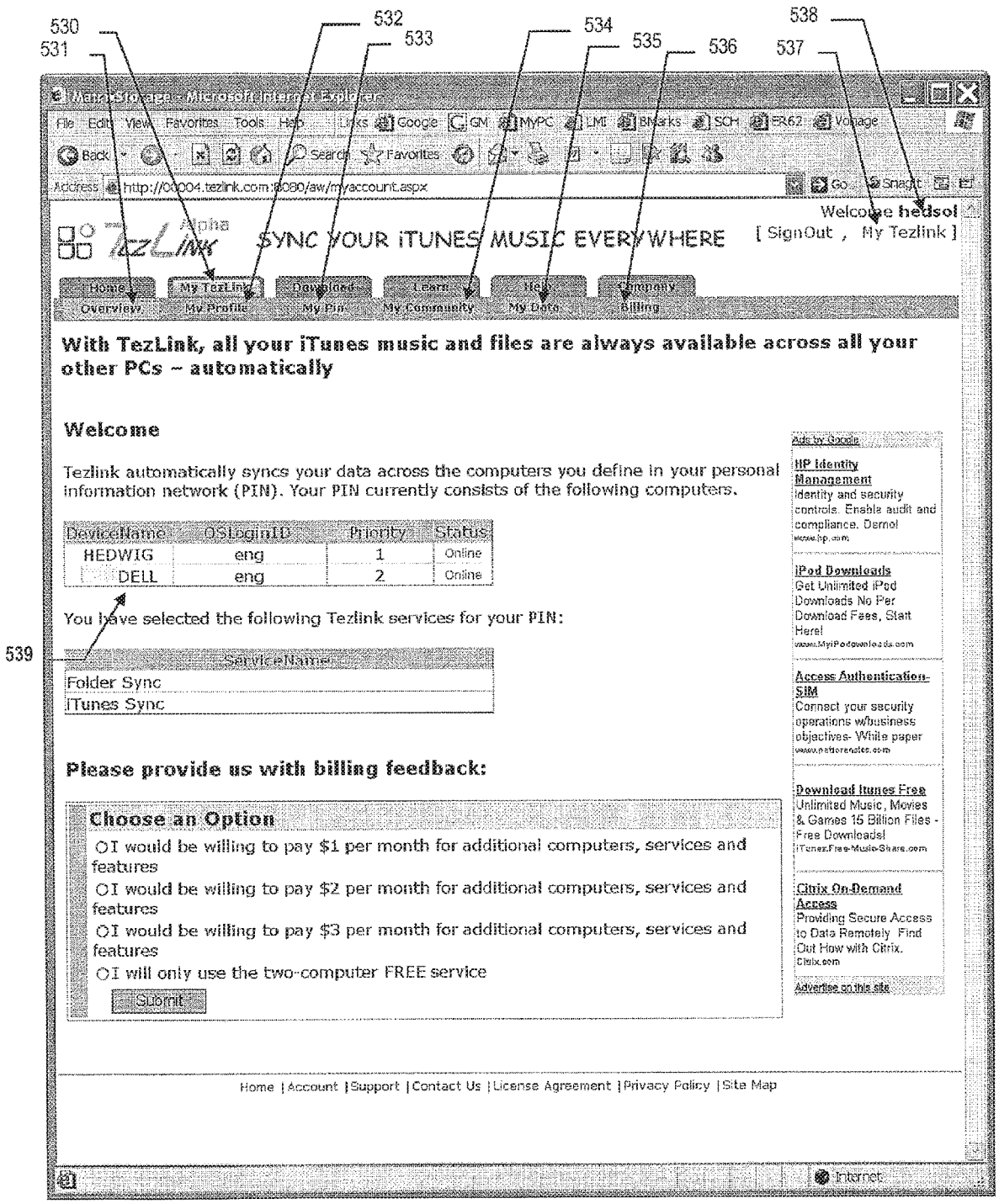
Figure 10. MWeb Management Interface – Overview

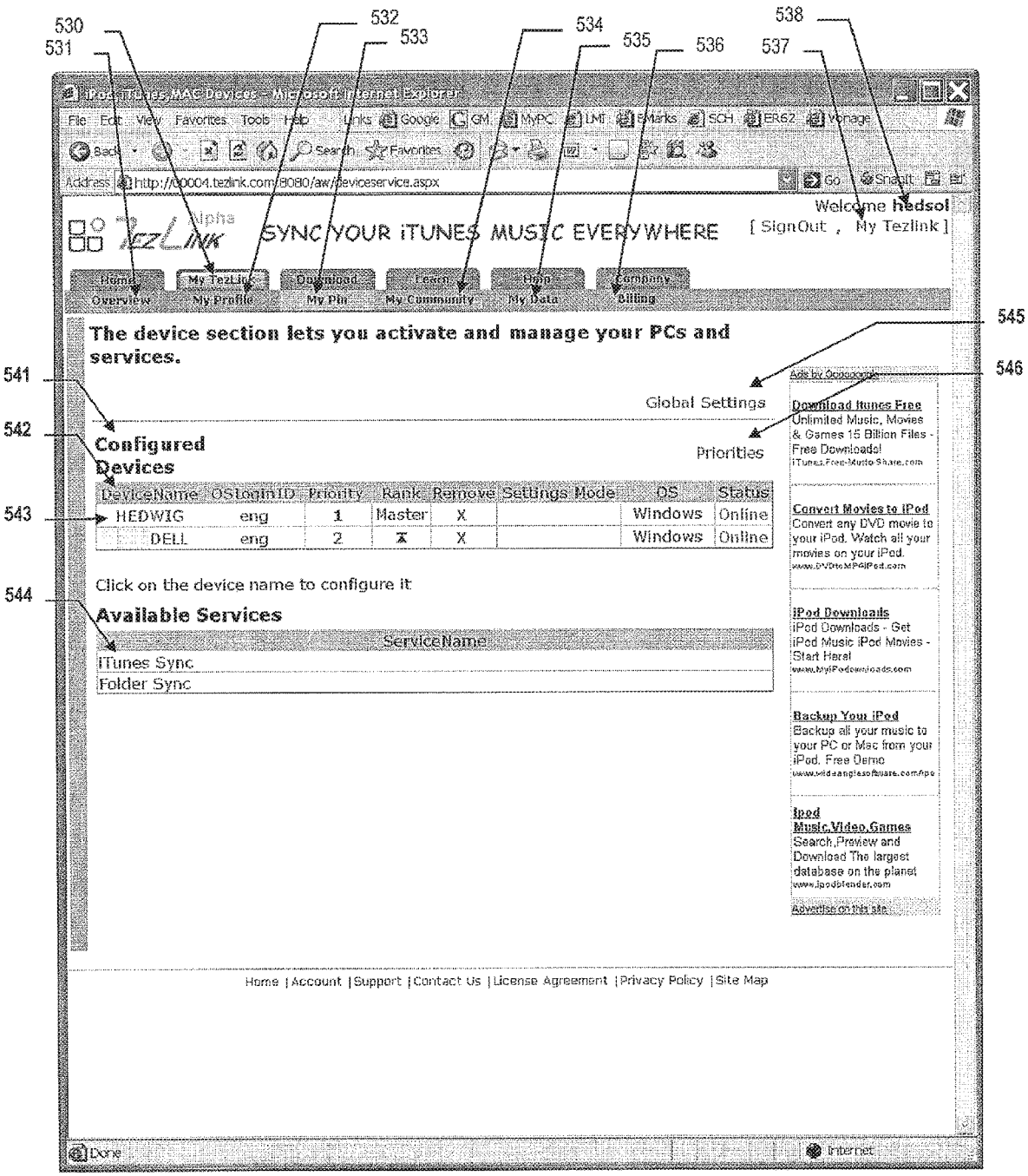
Figure 11. MWeb Management Interface – Personal Information Network

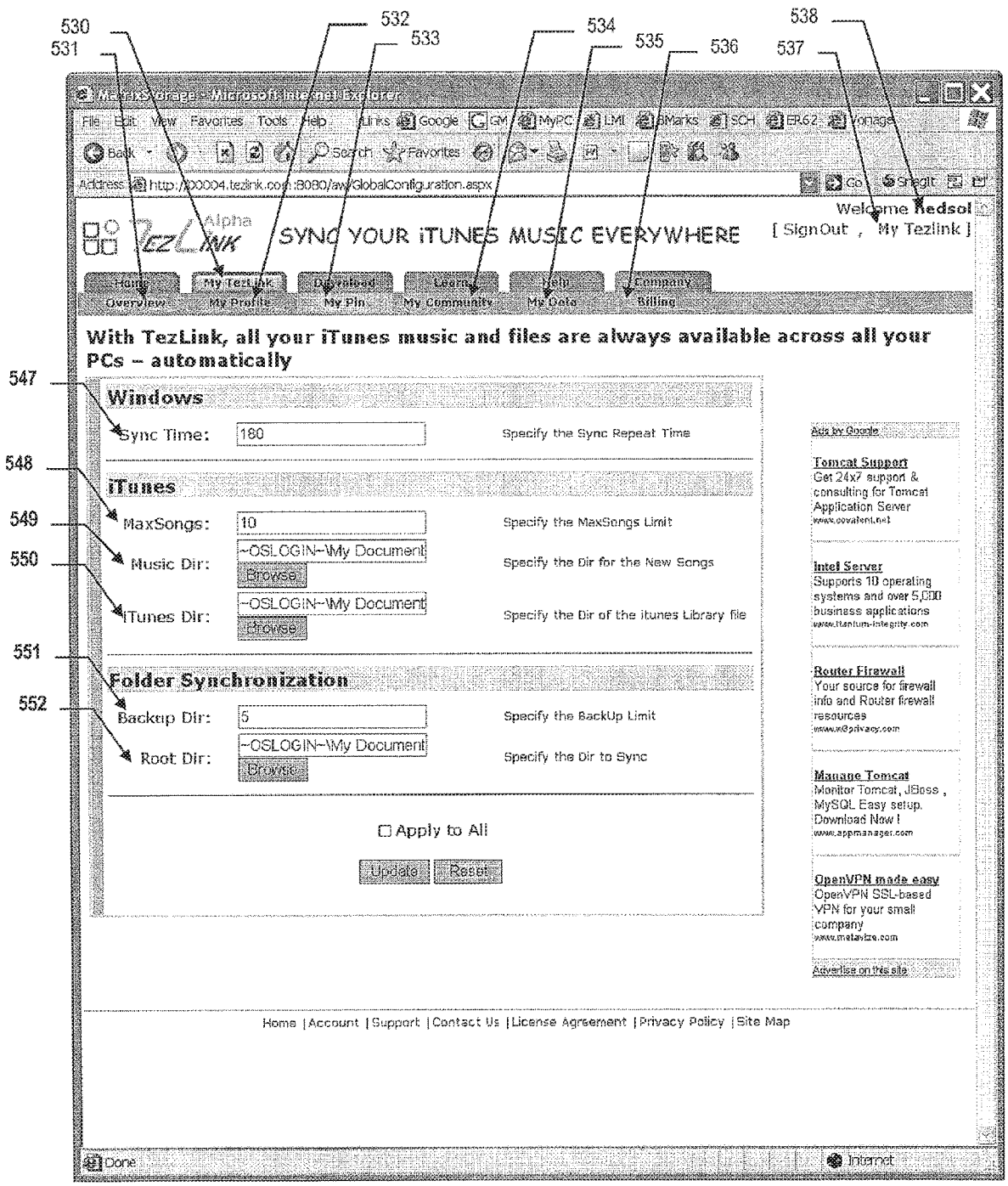
Figure 12. MWeb Management Interface – PIN Global Settings

SYSTEM AND METHOD FOR EFFICIENT REPLICATION OF AND ACCESS TO APPLICATION SPECIFIC ENVIRONMENTS AND DATA

CROSS REFERENCE TO RELATED APPLICATIONS

This application is a continuation of U.S. application Ser. No. 14/253,163 filed Apr. 15, 2014, which is a continuation of U.S. application Ser. No. 11/614,226 filed Dec. 21, 2006 and which is now U.S. Pat. No. 8,738,750, which claims priority from U.S. Provisional Patent Application Ser. No. 60/751,983, entitled "System and Method for Efficient Replication of and Access to Application Specific Environments and Data" and filed Dec. 21, 2005, the disclosures of all of which are incorporated herein by reference in its entirety.

FIELD

This invention relates generally to the field of peer-to-peer networking systems. More particularly, the invention relates to a peer-to-peer networking system designed to allow users to easily and securely backup, replicate, and access application specific environments or information repositories.

DESCRIPTION OF THE RELATED ART

Computer systems and hand held devices are continuing to grow their capacity in several dimensions: permanent storage, networking bandwidth, memory and processing power. Personal computer users are now able to store thousands of items of personalized content such as pictures, music, and movies. Users are using software applications to manage the importation of, and access to this personal content. These software applications are usually content specific and manage specific types of data for example Outlook handles emails, iTunes, Musicmatch, and Napster handle music, pictures, and video, and TiVo to go handles TV programs and so on . . . . While these content management programs manage their specific data adequately on one computer, these programs do NOT provide an automatic way of managing their specific data automatically across multiple computers in different security domains or environments. In addition, these programs only manage data explicitly imported into their content databases by the user. As a result, data management across multiple computers is a manual time consuming process. It has been estimated the typical computer user spends 15-25% of his or her time on non-productive informational related management tasks.

Third party peer-to-peer programs exist to perform content synchronization but they too do not understand the applications being synchronized and as a result configuring them to work properly is a manual process at best and, depending upon the application, may not be possible with simple file replication. Many peer-to-peer networking systems exist providing various file sharing capabilities. Some such systems provide tools for sharing content publicly where the users have no control of who can access the files, where the files resides, and how reliably the files are stored. Examples of such networks include the original Napster network, Kazaa, and Bit-torrent. Other systems provide explicitly defined security and remote sharing capabilities within ad-hoc user groups. An example of such an application is Groove. Still others provide strong explicitly defined data backup and replication capabilities but do not provide any networking security capabilities and need to have special network configurations such as (virtual) private networks to function properly.

The typical existing network 1 is depicted in FIG. 1. The network 1 contains personal computers with private IP addresses 10, running content management applications 11, storing and managing content metadata 12 and content data 13, hand held devices 14, connected via local area network (LAN) 15, to a firewall/network address translation (NAT) device with public IP addresses 16, which is connected to the Internet 17. The LAN 15 provides connectivity between local computers and devices. The firewall/NAT devices 16 protect the PCs from hackers and other malicious code such as viruses, worms, malware, and adware. Typically, the firewall/NAT 16 devices allow unlimited connections out to the Internet 17 but prevent access from other devices on the Internet 17. A typical user may have access to multiple PCs 10 that are within different security domains 18 (i.e. behind different firewalls 16 controlled by different organizations). For example, the user may have a home computer running on a home network, a notebook computer running a personal firewall, a work computer running in the office network, and/or a browser running in a public domain.

The content management applications 11 allow users to download, import, store, and access their content data 13. The applications 11 use the content metadata 12 to keep track of the specific content 13 associated with the applications 11. The applications 11 also automatically synchronize content 13 with the handheld devices 14. Conventional content management applications do not automatically synchronize content metadata 12 and content data 13 between (1) different user accounts on the same PC 10, (2) between different PCs 10 on the same LAN 15, or (3) between different PCs 10 in different security domains 18. Currently the methods recommended by content management vendors for synchronizing the content between different security domains 18 are follows: (1) Carry the handheld device 14 to the other location and manually copy the content 13 to the other PC 10; (2) Manually copy the content 13 to a DVD then carry the DVD to the other PC 10 and manually add the content 13 back to the other PC 10; (3) Manually email the content 13 to an mail account 24 and manually download the content 13 from the email account 24 and manually add it to the application 11 on the other PC 10; or (4) Manually copy the content 13 to a web storage service 19 to transfer the content 13 back from the service to the other PC 10 and manually add it to the application 11 on the other PC 10. All of these methods have the drawback that the content 13 is not automatically transferred between the desired devices 14 and PCs 10 and that the content 13 needs to be transferred explicitly file by file or directory by directory.

Currently, there are some file synchronizations services 20 such as Groove that allow users to synchronize file data between PCs 10 in multiple security domains 18. Using these services, known file data or content 13 can be transferred between the PCs 10. The drawbacks and disadvantages of using these file synchronization services 20 for synchronizing content 13 being managed by a content management applications 11 are that (1) the user must manually specify the files or directories that contain the content 13 that needs to be synchronized, (2) these file synchronization services 20 cannot synchronize content metadata 12 because the metadata 12 usually resides in a single file and only portions of the file must be synchronized between the PCs 10, (3) these file synchronization services 20 cannot synchronize content metadata 12 or content 13 that has been locked by the associated content management application 11, and (4) these file synchronization services 20 do not provide varying access rights to the owners' community of friends to the metadata 12 and content 13 in an application 11 meaningful context.

Currently, there are some third party file access services 21 that allow users to access their files via any web browser. The browser could be running on an Internet browser 22 or an Internet enabled handled device 23. Examples of Internet enabled handheld devices 23 include WiFi enabled PDA or Internet enabled cell phones. These services allow the user to access his/her content 13 from many locations as long as the user knows the underlying file structure of the content 13. The key drawbacks of these access services 21 are that (1) these access services 21 require the user to understand the content 13 file structure, (2) these access services 21 do not provide a content application 11 or content metadata 12 based view of the content 13, (3) these access services 21 do not provide content 13 synchronization or enhance content 13 availability, and (4) these access services 20 do not provide varying access rights to the owners' community of friends to the metadata 12 and content 13 in an application 11 meaningful context.

SUMMARY

The following summary provides an overview of various aspects of the invention described in the context of the related inventions incorporated-by-reference earlier herein (the "related inventions"). This summary is not intended to provide an exhaustive description of all of the important aspects of the invention, nor to define the scope of the invention. Rather, this summary is intended to serve as an introduction to the detailed description and figures that follow.

An embodiment relates generally to a system for the replication of application specific environments and their respective data. The system includes a set of computing devices running at least one application configured to process associated metadata and associated data on the computing devices. The system also includes a network configured to interconnect the set of computing devices and a set of peer agents executing on the set of computing devices, where each agent is executing on a respective computing device. Each agent is configured to communicate with at least one application and other agents. The processing system further includes a processing system configured to interface with the set of peer agents, where the processing system is configured to automatically access the associated metadata for at least one application and replicate the associated metadata to the set of peer agents over the network.

Another embodiment pertains generally to a system for replication of application specific environments between multiple applications handling common data across the multiple applications. The system includes a processing system configured to access associated metadata of each application of the multiple applications to determine common data and then replicate the associated metadata and transform the associated metadata from a first application to a second application allowing both the first and second applications to access the data. The system also includes a computing device running multiple applications, each application processing an associated metadata and common data on the computing device. The system further includes an agent executing on the computing device configured to communicate with the multiple applications, automatically and transparently transform and replicate the associated metadata between the different applications on the computing device.

Yet another embodiment relates generally to a system for replication of application specific environments between multiple applications using common or similar data across the multiple applications. The system includes a processing system configured to automatically access associated application specific metadata across the multiple applications to determine common or similar data, replicates the associated specific metadata and common or similar data, and transforms the associated application specific metadata and common or similar data from a first application to a second application of the multiple applications to allow the first and second application to use the common or similar data. The processing system further includes a computing device executing the multiple applications, where each application is configured to process a respective metadata but the same common or similar data on the computing device. The processing system also includes an agent executing on the computing device configured to communicate with the multiple applications and automatically and transparently transforms and replicates the associated specific metadata and common or similar data in response to two different applications which are configured to use the common or similar data.

Yet another embodiment pertains generally to a system for replication of application specific environments between multiple applications, each application using common or similar data. The system includes a processing system configured to automatically access respective application specific metadata of each application of the multiple application to determine common or similar data, replicate the respective specific metadata and common or similar data, and transforms application specific metadata and common or similar data from a first application to a second application in response to the first and second applications being different. The processing system further includes a set of computing devices, where each computing device is executing multiple different applications having respective metadata and common or similar data. The processing system also includes a set of peer agents, where each peer agent is executing on a respective computing device and configured to with the multiple applications, automatically and transparently transform and replicate respective metadata and the common or similar data in response to a first application being different from a second application.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods, and algorithms disclosed. In the drawings:

FIG. 1 is an illustration of a conventional networking environment with content management applications with prior art synchronization techniques;

FIG. 2 is an illustration of the detailed components required to perform application level synchronization of content management applications, content metadata, and content in accordance with another embodiment;

FIG. 3 is an illustration of the high-level components required to perform application level synchronization of content management applications, content metadata, and content in accordance with an embodiment along with a typical networking environment;

FIG. 4 is a flow diagram of the high-level components required to perform application level synchronization of content management applications, content metadata, and content in accordance with an embodiment;

FIG. 5 is an illustration of the detailed components required to perform inter-application level synchronization of content management applications, content metadata and content in accordance with yet another embodiment;

FIG. 6 is a flow diagram of the high-level components required to perform inter application level synchronization of content management applications, content metadata, and content in accordance with an embodiment;

FIG. 7 is a diagrammatic illustration of the MAgent graphical user interface (GUI) when all synchronization services are sleeping in accordance with yet another embodiment;

FIG. 8 is a diagrammatic illustration of the MAgent graphical user interface (GUI) showing the File service in the synchronization state with a file transfer in progress in accordance with yet another embodiment;

FIG. 9 is a diagrammatic illustration of the MAgent graphical user interface (GUI) showing the Log search page in accordance with yet another embodiment;

FIG. 10 is a diagrammatic illustration of the MWeb application's overview page in accordance with yet another embodiment;

FIG. 11 is a diagrammatic illustration of the MWeb application's personal information network (PIN) page in accordance with yet another embodiment;

FIG. 12 is a diagrammatic illustration of the MWeb application's PIN global settings page in accordance with yet another embodiment;

DETAILED DESCRIPTION OF EMBODIMENTS

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems that execute multiple applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to a new secure, peer-to-peer, application environment replication service or networking, synchronization, and backup service that provides the following functions: (1) the ability to replicate and provide access to application specific environments (data and metadata) that includes automatically accessing application specific metadata to determine the location of application specific data and then replicating or providing access to the application metadata and data to a set of peers; (2) the ability to replicate and provide access to application specific environments (data and metadata) that includes automatically accessing a source application's metadata to determine the location of the source application's data and then automatically transferring and transforming the application metadata and data to a target application's metadata and data; (3) the ability to provide owners with local and remote access to the metadata and data in an application meaningful context/environment across multiple applications managing similar data; and (4) the ability allow owners to create a community of buddies and associates who will have varying access rights to the owners' application metadata and data in an application meaningful context.

Embodiments of the invention, shown in FIG. 2 and FIG. 3, provide a solution to the above-mentioned problems that exist in the prior art solutions, in particular the embodiment provides the following functions: (1) the ability to replicate and provide access to application specific data 13 that includes automatically accessing application specific metadata 12 to determine the location of application specific data 13 and then replicating or providing access to such application metadata 12 and data 13 to a set of peers (MAgents 35); (2) the ability to replicate and provide remote Internet based access to application specific data 13 that includes automatically accessing a source application's 11 metadata 12 to determine the location of the source application's data 12 and then automatically transferring and transforming the application 11 metadata and data to a target application's 11 metadata 12 and data 13; (3) the ability to provide owners with local and remote access to said metadata 12 and data 13 in an application 11 meaningful context across multiple applications managing similar data; and (4) the ability to allow owners to create a community of buddies and associates who will have varying access rights to the owners' application metadata 12 and data 13 in an application 11 meaningful context.

FIG. 2 is an illustration of synchronization system 2 that include the high-level components and the main modules of those high-level components required to perform application level synchronization of content management applications, content metadata, and content in accordance with an embodiment. Accordingly, an implementation of the present embodiment is not limited to the modules described herein and may contain other generic modules within the components to perform general housekeeping functions such as marketing, advertising, billing, technical support and error handling. Moreover, the components of the application-level synchronization system 2 may be implemented in hardware, software, or combinations thereof as known to those skilled in the art.

Moreover, it should be readily apparent to those of ordinary skill in the art that the synchronization system 2 depicted in FIG. 2 represents a generalized schematic illustration and that other components may be added or existing components may be removed or modified. The components of the synchronization system 2 may be implemented in hardware, software, or combinations thereof as known to those skilled in the art.

FIG. 3 depicts an exemplary integration 3 of the synchronization system 2 shown in FIG. 2 in a conventional networking environment shown in FIG. 1. The integration 3 includes same or similar components as the conventional network 1. Accordingly, the description of the common features in FIG. 3 are omitted and the descriptions of these feature with respect to the FIG. 1 are being relied upon to provide adequate description of the comment features. Moreover, it should be readily obvious to those skilled in the art that the integration 3 depicted in FIG. 3 represents a generalized schematic illustration and that other components may be added or existing components may be removed or modified.

As shown in FIG. 2, an embodiment of the synchronization system 2 includes four major components: (1) MWeb 32, the central web-based and web services based application, which manages all the distributed MAgent 31 and MAccess 34 components. (2) MAgent 31 and 35, the synchronization program running locally on each computer 10 possibly within different security domains 18. (3) MRegistery 33, the centralized web services based application that enables MAgents 31 and MAccess 34 components to find each other even if they are in different security domains 18. (4) MAccess 34, the light-weight connection component that allows Internet browsers to access MAgents in different security domains.

The MWeb 32 component consists of the following sub-modules: a registration module 324, a device module 325, a MWeb security module 323, an application selection module 321 and a 114 MWeb user community module 322. The registration module 324 may be configured for new users to register for the application level synchronization and access service provide by the embodiments of the present invention. The device module 325 may be configured to allow device owners to add devices (computers 10) to be synchronized. The MWeb security module 323 may be configured to authenticate users and devices (e.g., computers 10, see FIG. 3), authorizes access, and encrypts data before transmission. The application selection module 321 may be configured to provide a user to very easily select the applications that they wish to synchronize. Once the application is selected, the appropriate MAgent app module 311 is activated to perform replication. The MWeb user community module 322 may be configured to allow the user to easily configure a community of friends, buddies and/or associates who will have varying access rights to the owners' application metadata 12 (see FIG. 3) and data 13 in an application 11 meaningful context.

The MAgent 31 may be configured to provide the core functionality of the synchronization system 2. The MAgent 31 is responsible for providing the application specific knowledge, for example, metadata 12 and data 13 replication, and application specific access. The MAgent 31 may comprise the following components: an App1 module 311 configured to understand the application's 11 metadata 12 and data 13 formats. More specifically, the App1 module 311 may automatically determine the locations of the application metadata 12 and data 13 through various mechanisms, such as registry data, file extensions/types, and application specific APIs. The App1 module 311 also provides all this information to the synchronization module 312. The MAgent 31 also includes a MAgent security module 313 which is configured to authenticate the remote peer MAgents 35, authorize access, and/or encrypt data before transmission. The MAgent 31 further includes a MAgent synchronization module 312, which is configured to establish communications to the remote peer MAgents 35 using the MRegistry 33 to locate the remote peer MAgents 35, and for replicating the metadata 12 of App1 11 and the data 13 of App1 11 based on the information provided by the MAgent App1 module 311. The MRegistry 33 maintains a list of online peer MAgents 31 and remote Peer MAgents 35 and provides a mechanism for them to locate and communicate with each other even if they are in different security domains 18 (see FIG. 3). The underlying communications between different security domains 18 can be provided by various well-known mechanisms including, but not limited to, a UDP punch thru, a shared email account 24, and web storage 19. The MAgent 31 further includes a MAgent remote access module 314, which is configured to provide web access in an application specific context to browser 22 or Internet enabled handheld device 23 running the MAccess 34 module. The MAccess 34 module uses the registry to find and establish communications to the MAgent remote access module 314 using the various well-know communication mechanisms to establish a communication channel to MAgent remote access module 314 in a manner that is similar to the way the synchronization modules of 312 of MAgent 31 and 35 establish communication channels. In addition to establishing the channel, the MAgent remote access module 314 generates custom application specific web site for each App1 Module 311. The browser 22 or the Internet enabled handheld device 23 access these application specific web sites bit talking to the MAcess 34 module that is running on its local processing unit.

Embodiments of the present invention are not limited to the interactions described herein and may contain other interactions between the modules and may also contain interactions with other generic modules within the components to perform general housekeeping functions such as marketing, advertising, billing, technical support and error handling. The order of these interactions may also be different than described herein. An example flow is shown in FIG. 4. The sample interactions are described as follows: (401) The MAgent 31 is initiated by the personal computer 10; (402) the MAgent security module 313 authenticates the MAgent 31 by presenting the user's username and password for verification to MWeb 32 and MRegistry 33; (403) The synchronization module 312 of the now authenticated MAgent 31 downloads its latest configuration values from MWeb 32; (404) the synchronization module 312 may be configured to transmit the MRegistry 33 the communication information (e.g., public and private IP endpoints) of the MAgent 31; (405) the App1 module 311 may be configured to contact App1 11 and obtains the metadata 12; (406) the MAgent 31 then waits for another peer to come online or for a browser 22 to contact it; (407) when the remote peer MAgent 35 comes online, the remote peer MAgent 35 initializes itself in the same manner that the MAgent 31 initialized itself in steps 401-405; (408) the remote peer MAgent 35 then contacts the MAgent 31 and indicates that it is online; (409) The synchronization module 312 then contacts the remote peer MAgent 35 and obtains the metadata of the remote peer MAgent 35. The MAgent synchronization module 312 then compares its metadata 12 with the metadata of the remote peer MAgent 35 and then proceeds to synchronize the metadata 12 and data 13 between itself and the synchronization module of MAgent 35. This compare and synchronization process is repeated periodically or when specific events occur in the App1 module 311. (410) If a browser 22 or an MAccess agent 34 (see FIG. 3) contacts the MAgent 31, then the MAgent remote access module 314 receives the request, formats the data 13 according to the rules created by the App1 module 311 and provides the data back to the browser 22 or the MAccess agent 34.

FIG. 5 depicts a more detailed view of the major components relevant to another embodiment of the present invention for inter-application synchronization system 5. It should be readily apparent to those of ordinary skill in the art that the inter-application synchronization system 5 depicted in FIG. 5 represents a generalized schematic illustration and that other components may be added or existing components may be removed or modified. Accordingly, an implementation of the present embodiment is not limited to the modules described herein and may contain other generic modules within the components to perform general housekeeping functions such as marketing, advertising, billing, technical support and error handling. Moreover, the components of the inter-application synchronization system 5 may be implemented in hardware, software, or combinations thereof as known to those skilled in the art.

The MWeb 32 component may include the following modules: a registration module 325, a device module 324, a MWeb security module 323, a user community module 322 and an application selection module 321. The registration module 325 allows new users to register for the application level synchronisation and application specific access services provide by embodiments of the present invention. The device module 324 allows device owners to add devices (computers 10) to be synchronized. The MWeb security module 323 may be configured to authenticate users and devices (computers 10), authorize access, and encrypt data before transmission. The application selection module 321 may be configured to allow a user to easily select the applications that they wish to synchronize. Once the application(s) is/are selected, the appropriate App1 module 311 and App2 module 315 are activated to perform replication and the inter-application synchronization. The user community module 322 allows the user to easily configure a community of friends, buddies and/or associates access to the data 13. More specifically, the user community module 322 may be configured to vary the access rights of each selected member to access the metadata 12 and/or data 13 in an application 11. Users will be able to search for friends by their userID and invite them to become their buddy. Buddies will be able to select click on the MAgent 31 or MWeb 32 access tab and select buddy. Then the user can select a play list of the selected buddy to listen to.

The MAgent 31 may be configured to provide the core functionality of the inter application synchronization system 5 More particularly, the MAgent 31 may be responsible for providing the application specific knowledge, for example, metadata 12 and data 13, replication, inter-application replication, and access.

The MAgent 31 may include an App1 module 311, a synchronization module 312, a MAgent security module 313, a remote access module 314 and an App2 module 315. The App1 module 311 may be configured to understand the metadata 121 of the App1 111 and associated data 13 formats. The App2 module 315 may be configured to understand the metadata 122 of App2 112 and associated data 13 formats. The App1 module 311 may be configured to automatically discover the locations of the application metadata 121 and associated data 13 through various mechanisms, such as registry data, file extensions/types, database protocols, and application specific APIs. The App2 module 315 may be configured to automatically discover the locations of the application metadata 122 and associated data 13 through similar mechanisms used by App1 module 311. There are various mechanisms to program the App1 module 311 and App2 module 315 (collectively called the application modules) to understand the metadata 121 and 122. If the metadata is stored in a readable file, then the application modules would be programmed to read and parse the metadata files. If the App1 111 and/or App2 112 provide an application programming interface (API), then the application modules would be programmed to call the appropriate APIs to access the metadata. If the metadata is stored in a database, then the application modules would be programmed to read and parse the database records. The MAgent application modules 311 and 315 also provide all this information to the synchronization module 314.

The MAgent security module 313 authenticates remote peer MAgents 35 by presenting the user's database and password for verification, authorizes access, and encrypts data before transmission.

The synchronization module 312 is responsible for establishing communications to remote peer MAgent 35 using the MRegistry 33 to find the remote peer MAgents 35, and for replicating the metadata 121 and 122 and associated data 13 of App1 311 and App2 315, respectively. The synchronization module 312 is also responsible synchronizing data between compatible applications (app1 111 and app2 112). The synchronization module 112 is programmed to detect compatible applications based upon the type of data 13 that the respective application manages. For applications managing compatible data 13, the metadata 121 and 122 are usually quite different between applications. The synchronization module 312 is programmed to understand the differences and can translate/transform and replicate the changes between the metadata of the two applications' metadata 121 and 122. Some applications may handle different formats of the same kind of data. Where appropriate, the synchronization module 312 will translate/transform the data between different formats of the same kind of data when the change in format is required for the different applications to function properly. By way of example only, for data 13 that consists of music, the different formats may be determined by streaming bandwidth, file type, and file DRM (digital rights management) rules. When transforming between different formats, the synchronization module 312, takes care to preserve and enforce DRM rules between the different formats. If for example, a source data file is only valid until a certain date, then the destination data file is only valid until that particular date as well.

The MRegistry 33 may be configured to maintain a list of online peer MAgents 31 and remote peer MAgents 35 and allows them to find and communicate with each other even if they are in different security domains. The underlying communications between different security domains can be provided by various well-known mechanism including but not limited to UDP punch through, a shared email account 24, and web storage 19.

The remote access module 314 may be configured to provide web access in an application specific context to browser 22 or Internet enabled handheld device 23 running the MAccess 34 module (see FIG. 3).

Embodiments of the present invention are not limited to the interactions described herein and may contain other interactions between the modules and may also contain interactions with other generic modules within the components to perform general housekeeping functions such as marketing, advertising, billing, technical support and error handling. The order of these interactions may also be different than described herein.

An example flow is depicted in FIG. 6. The sample interactions are described as follows: (411) The MAgent 31 is initiated by the personal computer 10. (412) The MAgent security module 313 authenticates the MAgent 31 by presenting the user's username and password for verification to MWeb 32 and MRegistry 33. (413) The MAgent synchronization module 312 of the now authenticated MAgent 31 downloads its latest configuration values from MWeb 32. (414) The MAgent synchronization module 312 sends the MRegistery 33 the MAgent's communication information (public and private IP endpoints). (415.0) The App1 module 311 contacts App1 111 and obtains the metadata 121 and the App2 module 315 contacts App2 112 and obtains the metadata 122. (415.1) For compatible applications, the synchronization module compares the metadata 121 and the metadata 122 and updates both of application's metadata 121 and 122 so both App1 111 and App2 112 can see each others data. (415.2) For compatible applications which require different formats of data 13, the synchronization module 312 transforms the source applications data to the format of the destination applications data. (416) The MAgent 31 then waits for another peer to come online or for a browser 22 to contact it. (417) When the remote peer MAgent 35 comes online, the remote peer MAgent 35 initializes itself in the same manner that the MAgent 31 initialized itself in steps 411-415. (418) The remote peer MAgent 35 then contacts the MAgent 31 and indicates that it is online. (419) The MAgent synchronization module 312 then contacts the remote peer MAgent 35 and obtains the metadata of the remote peer MAgent 35. The MAgent synchronization module 312 then compares its metadata 121 and 122 with the metadata of the remote peer MAgent 35 and then proceeds to synchronize the data 13 between itself and the synchronization module of MAgent 35, changing the data formats as required or needed. This compare and synchronize process is repeated periodically or when specific events occur in the App1 module 311 or the App2 module 315. (420) If a browser 22 or an MAccess agent 34 contacts the MAgent 31, then the MAgent remote access module 312 receives the request, formats the data 13 according to the rules provided by the App1 module 311 or the App2 module 315 and provides the data back to the browser 22 or the MAccess agent 34.

The underlying communications between different security domains 18 can be provided by various well-known mechanisms. An embodiment may select to use UDP punch thru as the default communications mechanism for MAgents 31 and 35 in different security domains. The synchronization module 312 of the MAgents 31 and 35 may contain a UDP punch through sub-module which specifically handles the UDP punch through tasks. Generally, UDP punch through is composed of several different phases: a discovery phase, a punch through phase and a data transport phase. In the discovery phase, the UDP sub-modules in MAgent 31 and 35 talk to a central server, the MRegistery 33, to discover their public IP endpoints. The UDP sub-modules then register this data with the MRegistry 33 and obtain their peers' end point information from the MRegistery 33. The UDP sub-modules then begin the punch through phase where they start sending data to each others' public IP endpoint. Most firewalls 16 will allow the incoming UDP traffic in because out going traffic is also occurring on the same public endpoint. Once the UDP sub-modules detect traffic from each other, they can start transferring data. Several mechanisms can be used to send TCP/IP traffic over a UDP connection, these include but are not limited to encapsulating the TCP/IP traffic in UDP/IP packets or terminating the TCP/IP packets locally and reliably sending the packets' content in UDP packets. Reliable transport of UDP packets can be achieved by implementing error control and congestion control mechanisms in the application transmitting the UDP packets. An implementation of the present invention is not limited to the UDP punch through as described herein and may contain other communication mechanisms such as a shared email account 24, and/or web based storage 19.

FIGS. 7-13 depict exemplary graphic user interfaces (GUI) for various embodiments of the MAgent 31 and 35. The GUI of the present invention is described with specificity to meet statutory requirements and shows the GUI in its current state. However, the description itself is not intended to limit the scope of this patent. Rather, the inventor has contemplated that the GUI might also be embodied in other ways, to include different elements or combinations of elements similar to the ones described in this document, in conjunction with other present or future technologies. Moreover, although the term "elements" (menu items, tabs, buttons, links, icons, status messages, etc) may be used herein to connote different objects employed, the term should not be interpreted as implying any particular order or graphical relationship among or between various elements herein disclosed unless and except when the order or graphical relationships of individual elements is explicitly described.

FIG. 7 displays a graphical user interface ("GUI") for a default status of the MAgent 31 and 35. It should be readily apparent to those of ordinary skill in the art that GUI depicted in FIG. 7 represents a generalized schematic illustration and that other elements may be added or existing elements may be removed or modified.

As shown in FIG. 7, the title bar 500 displays the application's title. The file menu 501 allows access to the application's properties and allows the user to exit the application and service. The help menu 502 tells the user the version number of the program. The Services tab 503 lists the current services and displays there status. The logs tab 504 allows the user to search for and access activity logs and error messages. The access tab 505 allows the user to access his own or his buddies' data. The access tab 505 is still under development. The community tab 505 allows the user to add and remove buddies and associates. The community tab 506 is still under development.

The play button 507 allows the user to initiate a synchronization cycle for this service manually. The title section 508 displays the title of this synchronization service, iTunes. The stop button 509 stops synchronization for this service. The status icon 510 is currently displaying the default active but sleeping icon. The status icon 510 changes as this synchronization service changes to different states. The status message 511 displays the current state of this synchronization service.

The My Tezlink link 512 takes the user to the web based configuration manager, MWeb 32. The user name 513 displays the owner of this Magent 31 instance.

The play button 517 allows the user to initiate a synchronization cycle for this service manually. The title section 518 displays the title of this synchronization service, Files. The stop button 519 stops synchronization for this service. The status icon 520 is currently displaying the default active but sleeping icon. The status icon 520 changes as this synchronization service changes to different states. The status message 521 displays the current state of this synchronization service.

FIG. 8 displays the status of the MAgent 31 GUI when the Files synchronization service is in the synchronization (syncing) state and a file has been found that need to be uploaded to the peer MAgent 35. The play button 517 now has a different image and takes on the 'pause' role and is now called the pause button 517a. If the user hits the pause button

517a the synchronization is halted for the related service. During a file upload, the circle of the status icon 520 becomes solid green and the two left boxes of the icon become a flashing gray and white up arrow indicating that a file is being sent to the remote peer MAgent 35. If the local MAgent 31 need to download a file from the remote peer MAgent 35, the left two boxes of the icon become a flashing gray and white down arrow indicating the file is being received from the remote peer MAgent 35. During synchronization, the message status 521 displays 'syncing' indicating that the related application's (Files) metadata and data are being updated between the MAgents 31 and 35. When a file is being uploaded or downloaded, a file status message 514 appears indicating the direction of the transfer (uploading or downloading), the number of chunks of the file that have been transferred, the peer Magent's 35 name, and the file name. Chunks represent an arbitrary configurable amount of data that is transferred in a single transfer command. The transfer status bar 515 shows how much of the file has been transferred as a percentage. The transfer status message 516 indicates textually how much of the file has been transferred.

FIG. 9 displays embodiments of the "Logs" page. This page is displayed when the Logs tab 504 is clicked. The user search for various log files by filling out the from date field 522 and the date field 523 and then clicking the search button 524. The results of the search are displayed in the results window 525. The user can then click on any of the displayed files to view their status.

FIG. 10 displays an embodiment of the MWeb 32 application's header and the MWeb overview page. Users are directed to this page when they click the My TezLink 512 link or the File-Configuration submenu on the MAgents 31 and 35. The MAgents 31 and 35 automatically provide the users credentials, username and password, to MWeb 32 and valid users are automatically logged into the site. A portion of the header indicates the user who is logged in: "hedsol" 538. The user can also sign out of MWeb 32 by clicking the SignOut 537 link. Users can also go directly to the MWeb 32 site and sign into the application manually.

The header allows users to navigate the MWeb 32 web site as well as access the MWeb 32 application. The MWeb 32 application can be accessed by clicking the "My Tez-Link" 530 button. The MWeb 32 application has the following pages: Overview 531, My Profile 532, My Pin 533, My Community 534, My Data 535, and Billing 536. The My Community 534 page is still being developed and will display the user's buddies and associates. The My Data 535 page is still being developed and will allow the user to access his own content, or stream content from his buddies or associates. The Billing 536 page is still being developed and will allow the user to review billing history and purchase new services or devices.

The Overview 531 page provides a list of MAgents 31 and 35 associated in the account in table 539. This table 539 also provides some details about the MAgents 31 and 35 such as (but not limited to) the login id, the priority, and the online status.

FIG. 11 shows an embodiment of the personal information network, PIN, page. Users navigate to this page by clicking the My Pin 533 link. The page provides more details about the configured MAgents 31 and 35 in the Configured Devices table 541. The header 542 of the configured devices table 541 allows user to sort the devices by Device Name, OS Login ID, or Priority. The device names are the names of each of the devices on which users have MAgents 31 and 35. The OS Login ID is the login id of users on each of their devices. The priority determines which MAgent 31 and 35 is the master, the MAgent 31 and 35 who controls the synchronization process. Users click on the MAgent 31 and 35 names 543 to configure MAgent 31 and 35 specific parameters. Users click on the service 544 links to configure global parameters of each specific service. Users click on the global settings 545 link to change global settings for all MAgents 31 and 35. Users click the priorities 546 link to adjust the priorities of the MAgents 31 and 35. Users can also click X's in the Remove column of the Configured Devices table 541 to delete an MAgent 31 and 35 from their account.

FIG. 12 depicts an embodiment of the global settings 545 sub-page of the My Pin 533 page. Users can set various parameters that affect all their MAgents 31 and 35. The sync time 547 determines how much time the MAgents 31 and 35 sleep between synchronization cycles. The MaxSongs 548 determines the maximum number of songs that can be backed up. The Music Dir 549 determines the directory in which songs will be placed. The iTunes Dir 550 determines where the iTunes music library can be found. The Backup Dir 551 determines the number of backup files to keep for a particular file. The Root Dir 552 determines the default location of the directory that is synchronized between MAgents 31 and 35.

It will be appreciated that the embodiments described above and illustrated in the drawings represent only a few of the many ways of implementing a system and method for efficient replication of and access to application specific environments and data.

Referring to FIG. 3, the personal computer 10 may be implemented by any personal or other type of computer system (e.g., IBM-compatible, Apple, Macintosh, laptop, palm pilot, etc.). The personal computer 10 may include any commercially available operating system 19 (e.g., Windows, OS/2, Unix, Linux, PalmOS, Symbian, etc.). The computer systems may further include any commercially available or custom software (e.g., server software, browser software, viewing software, etc.), database and/or database management systems. The computer systems may further include any types of input devices (e.g., keyboard, mouse, voice recognition, etc.) to navigate the screen, enter information and/or actuate buttons or icons. The databases may be implemented by any conventional or other database or storage structure (e.g., file, data structure, etc.). The servers (MWeb 32 and MRegistery 33) may be composed of redundant servers and may be of any quantity of such servers and may lag or transfer information between each other at any desired time intervals (e.g., seconds, minutes, hours, days, etc.).

It is to be understood that the software for the computer systems (e.g., personal computers, servers, and handhelds etc.) may be implemented in any desired computer language and could be developed by one of ordinary skill in the computer arts based on the functional descriptions contained in the specification and flow charts illustrated in the drawings. By way of example only, the software for the functionality of the embodiments of the present invention (e.g., MAgent 31 and 35, MWeb 32, MRegistery 33, etc.) may be developed utilizing JAVA Script, HTML, Visual Basic Script, MS C #, .NET Technology and/or C computer languages. The computer systems may alternatively be implemented by any type of hardware and/or other processing circuitry. The various functions of the computer systems may be distributed in any manner among any quantity of software modules, processing or computer systems and/or circuitry. The software and/or algorithms described above and illustrated in the flow charts may be modified in any manner that accomplishes the functions described herein.

The networks (e.g., public, private, virtual private, etc.) may be implemented by any communications network (e.g., LAN, WAN, Internet, Intranet, VPN, etc.). The computer systems may include any conventional or other communications devices to communicate over the networks via any conventional or other protocols. The functions of the MWeb 32 and MRegistry 33 may be distributed among servers, redundant servers, and/or personal computers in any desired fashion.

The MWeb 32 and MRegistry 33 database may be implemented by any quantity of any conventional or other database or storage units. The database may store any desired information. The file system may be implemented by any quantity of any conventional or other file storage system and may store any desired information. The codes may be stored within the file system and/or database in any desired fashion (e.g., the file system and database may individually or collectively store the codes in any desired combination or fashion, etc.). The MAgents 31 and 35, MWeb 32 and MRegistry 33 may utilize any desired codes to validate users and sessions (e.g., checksum, hash code, assign unique identifiers, etc.). The system may be utilized with or without validation.

The MWeb 32 and MRegistry 33 may communicate and/or retrieve information from any quantity of MAgents 31 and 35 utilizing any desired formats or interfaces. The data and metadata within the MAgents 31 and 35 may be associated with any programs via any suitable identifiers (e.g., alphanumeric, symbols, etc.). The MAgents 31 and 35 may poll each other and the MWeb 32 and MRegistry 33 at any desired intervals to retrieve information. The information may be retrieved based on any suitable criteria (e.g., time, new online/offline events, new data, new metadata, etc.). The button or switch may be implemented in any fashion (e.g., software, hardware signal, etc.) to enable the MAgents 31 and 35 to access the MWeb 32, and MRegistry 33.

The MAgents 31 and 35 may utilize any conventional or other caching techniques (e.g., transmit configuration, data, and metadata requests in any order, utilize any techniques (e.g., FIFO, etc.), proactively transfer configuration, data and metadata to each other based on any suitable criteria (e.g., priority, type of service, type of data, etc.), to transmit data to each other prior to requests for that item. The MAgent 31 and 35 memories may be implemented by any conventional or other storage device and may include any desired storage capacity. The MAgent 31 and 35 memories may store any desired quantity of configurations, data, and metadata during any desired time interval (e.g., days, etc.). The MAgent 31 and 35 synchronization module 312 may send the images to each other at any desired time intervals or in response to any suitable conditions (e.g., receipt of new data, etc.). The MAgents 31 and 35 may associate users with locations in any desired fashion (e.g., zones, areas, etc.) and based on any suitable identifiers (e.g., IP or other addresses of any local components, etc.).

The various topologies (e.g., FIGS. 2-5) for MWeb 32, and MRegistry 33 may be arranged in any desired fashion and include any quantity of components. The MAgents 31 and 35 and MAccess 34 may include any quantity of components arranged or in communication with each other in any desired fashion.

The display screens or web pages and windows may be arranged in any fashion and contain any type of information (e.g., the number of devices, the synchronization state, the file transfer status, etc.). The display screens or web pages and windows may be navigated or viewed in any desired order or fashion. The screens may include any quantity of any type of buttons or icons of any shapes, sizes or colors and disposed at any locations to initiate any desired actions or indicate any desired conditions. The screens may include any quantity of any type of fields (e.g., fill in, drop down menus or lists, etc.) of any shapes or sizes disposed at any locations to receive information from the system and/or user and/or to display information. The system may automatically log out users after any desired time interval and may track any desired information pertaining to a session (e.g., configuration changes, new devices, new services etc.). The system may display and/or receive information via any input mechanisms (e.g., screens, menus, line prompts, forms, fields, etc.) or input devices (e.g., keyboard, mouse, voice recognition, etc.). The system may limit user access to information in any desired fashion and based on any suitable criteria (e.g., users may be limited to viewing information of buddies, or associates, etc.).

The tables may be arranged in any fashion and include any information listed in any desired order (e.g., based on any information). The search may be performed based on any desired searching criteria (e.g., any table or database field, dates or range of dates, etc.). The table entries may be sorted in any desired fashion or order based on any quantity of any desired table columns. The system may display in any fashion any quantity of images or patient information for comparison or other purposes. The system may enable communication by any quantity of any desired users based on any conditions or criteria (e.g., updated or new data or metadata, status of a user, etc.).

The MWeb 32 and MRegistry 33 may be utilized in combination with any suitable communications systems (e.g., voip, email, IM, etc.) in any desired fashion to provide enhanced user experiences. These other communication systems may provide any suitable icon or other indicator to indicate the capability of synchronizing application specific environments.

The present invention may employ various techniques to validate the synchronization of data and metadata. For example, file size, time stamp, hash codes, or CRC validation may be performed on the data and metadata. The comparison may be performed with respect to any desired units (e.g., seconds, minutes, bytes, etc.). An error message may be displayed to notify users of data or metadata that appears invalid.

It is to be understood that the terms "top", "bottom", "side", "upper", "lower", "front", "rear", "horizontal", "vertical" and the like are used herein merely to describe points of reference and do not limit the present invention to any specific configuration or orientation.

The embodiments of the present invention is not limited to the applications disclosed herein, but may be utilized for any type of media or other application to enable remote access of applications.

From the foregoing description, it will be appreciated that the invention makes available a novel system and method for efficient replication of and access to application specific environments and data.

Having described preferred embodiments of a new and improved system and method for efficient replication of and access to application specific environments and data, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for replicating at least application level metadata of a specific application comprising:
- a first hardware device comprising a processor and a memory, in a first security domain, for storing instructions and application level metadata or application level metadata and data, the instructions executable to:
  - access first application level metadata, from the stored application level metadata, of a first specific application stored in the first device to determine the location of first data specific to the first specific application;
    - (i) compare the accessed, first application level metadata to second application level metadata of the first specific application of a second hardware device in a second security domain, respectively; and
      - replicate the accessed, first application level metadata and transform the second application level metadata to the replicated first application level metadata to at least provide the first and second application level metadata in a same first format and to allow the first specific application to use the replicated first application level metadata,
    or
    - (ii) compare the accessed, first application level metadata and first located data, respectively, to second application level metadata and second data of the first specific application of a second hardware device in a second security domain, respectively;
      - replicate the accessed, first application level metadata and located first data and transform the second application level metadata and second data to the replicated first application level metadata and first data to at least provide the first and second application level metadata and their respective data in a same first format and to allow the first specific application to use the replicated first application level metadata and data; and
  - provide a different level of access to the first application level metadata or the first application level metadata and the located first data of the first specific application to one or more specified and authenticated buddies or associates of a user associated with the first hardware device.

2. The system as in claim 1 wherein the first hardware device further receives a request to communicate with the second hardware device from the second hardware device.

3. The system as in claim 1 further comprising a plurality of additional hardware devices, one or more of the additional hardware devices in a different security domain than the first and second hardware devices, and each of the additional hardware devices operable to communicate with the first hardware device to provide additional application level metadata or additional application level metadata and data of the first specific application to the first hardware device.

4. The system as in claim 3, wherein the second hardware device or any one of the plurality of the additional hardware devices are operable to receive the replicated first application level metadata or the replicated, first application level metadata and first data from the first hardware device.

5. The system as in claim 1 wherein the first specific application is a media content management application.

6. The system as in claim 1 wherein the first specific application comprises a music application.

7. The system as in claim 1 wherein the first hardware device further stores instructions executable to replicate the accessed first application level metadata or the accessed first application level metadata and the located first data in a second format compatible with a second specific application, and transmit the so formatted first application level metadata or the so formatted first application level metadata and located first data to one or more other hardware devices.

8. The system as in claim 7 wherein the first hardware device further stores instructions executable to receive application level metadata and data in the second format compatible with the second specific application from the one or more other hardware devices.

9. The system as in claim 1 wherein the first hardware device further stores instructions executable to compare the accessed first application level metadata or the accessed first application level metadata and located first data of the first specific application to application level metadata and data of a second specific application to determine whether the respective application level metadata or the respective application level metadata and data of the two specific applications are synchronized.

10. The system as in claim 1 wherein the first hardware device further stores instructions executable to transmit the replicated first application level metadata or the replicated first application level metadata and located first data associated with the first specific application using secure communications to at least the second hardware device.

11. The system as in claim 1 wherein the first specific application comprises an imaging application.

12. The system as in claim 1 wherein the first specific application comprises a picture application.

13. The system as in claim 1 wherein the first specific application comprises a video or movie application.

14. The system as in claim 1 wherein the first specific application comprises a distributed ledger application.

15. The system as in claim 1 wherein the first hardware device further stores instructions executable to validate the replication of the first application level metadata or the first application level metadata and first data of the first specific application.

16. The system as in claim 1 wherein the system further provides the different level of access via a remote Internet based access.

17. The system as in claim 1 wherein the buddies comprise trusted buddies.

18. The system as in claim 1 wherein the buddies comprise untrusted buddies.

19. A method for replicating at least application level metadata comprising:
- accessing first application level metadata of a first specific application stored in a first hardware device to determine the location of first data specific to the first specific application;
- comparing the first application level metadata or the first application level metadata and located first data, respectively, to second application level metadata or second application level metadata and second data, respectively of the first specific application from a second hardware device in a second security domain;
- replicating the first application level data metadata or the first application level metadata and located first data and transform the received second application level metadata or second application level metadata and second data to the replicated first application level metadata or replicated first application level metadata and located first data to at least provide the first and second application level metadata and their respective data in a same first format and to allow the first specific application to use the replicated first application level metadata or replicated first application level metadata and located first data; and providing a different level of access to the first application level metadata or to the first application level metadata and located first data of the first specific application to one or more specified and authenticated buddies or associates of a user/owner associated with the first hardware device.

20. The method as in claim 19 further comprising:

creating a community of buddies and associates, including the specified and authenticated buddies or associates, that have a different level of access to the first application level metadata or to the first application level metadata and located first data.

21. A method for accessing at least application level metadata comprising:

accessing a user's application specific, application level metadata of a specific application to determine the location of the user's data of the specific application without configuring files and file level metadata or data;

creating a community of buddies and associates that have a different level of access; and providing the different level of access Roll (i) to the application specific, application level metadata or (ii) to the application specific, application level metadata and the located user's data or (iii) to the located user's data to the community of buddies and associates.

22. The method as in claim 21 further comprising:

providing access to (i) the application specific, application level metadata or (ii) to the application specific, application level metadata and located data or (iii) to the located data to a plurality of different applications managing data, where the managed data is substantially the same as the located user's data.

* * * * *

UNITED STATES PATENT AND TRADEMARK OFFICE
CERTIFICATE OF CORRECTION

PATENT NO. : 10,873,570 B2
APPLICATION NO. : 15/628065
DATED : December 22, 2020
INVENTOR(S) : Imran Chaudhri It is certified that error appears in the above-identified patent and that said Letters Patent is hereby corrected as shown below:

In the Claims

Column 19, Line 19, cancel the text beginning with "21. A method for accessing at least application level" to and ending "to the community of buddies and associates" in Column 20, Line 12, and insert the following claim:
--21. A method for accessing at least application level metadata comprising:
accessing a user's application specific, application level metadata of a
specific application to determine the location of the user's data of the specific application
without configuring files and file level metadata or data;
creating a community of buddies and associates that have a different level
of access; and
providing the different level of access (i) to the application specific, application level metadata or (ii) to the application specific, application level metadata and the located user's data or (iii) to the located user's data to the community of buddies and associates.--

Signed and Sealed this
Twelfth Day of August, 2025

Coke Morgan Stewart
*Acting Director of the United States Patent and Trademark Office*